3,382,999
CATHODE-RAY TUBES AND METHOD OF REINFORCING THE TUBES
Daryl E. Powell, Maumee, and Burton W. Spear, Toledo, Ohio, assignors to Owens-Illinois, Inc., a corporation of Ohio
Filed Dec. 14, 1964, Ser. No. 418,065
11 Claims. (Cl. 220—2.1)

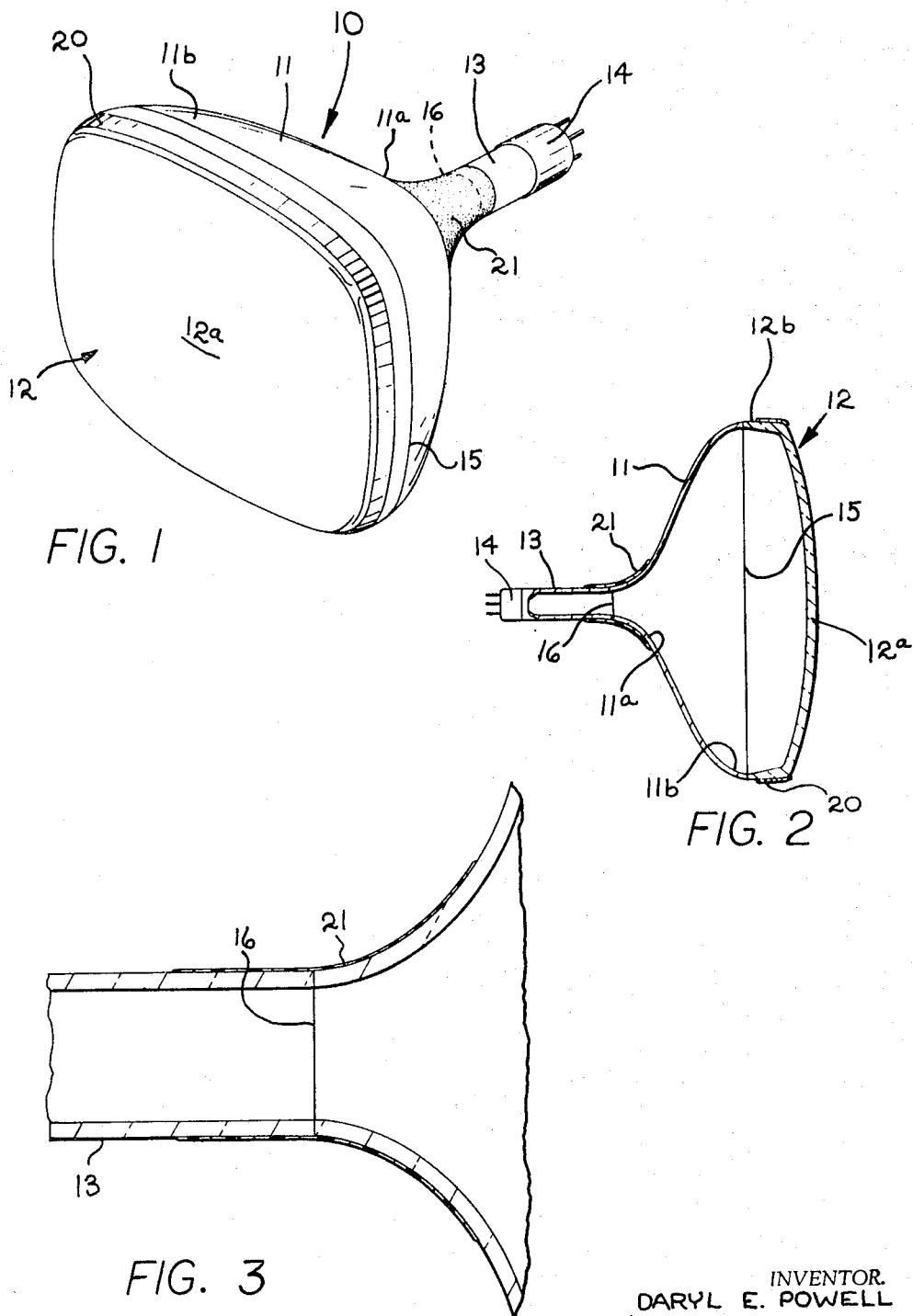

ABSTRACT OF THE DISCLOSURE

This invention relates to providing a direct-viewing, implosion-resistant cathode-ray tube envelope which is especially resistant to implosions caused by sources originating in the neck and neck-yoke areas of the envelope. The all-glass envelope is reinforced at both non-viewing areas of maximum cross-sectional dimensions and said neck or neck-yoke region in a prescribed manner, the latter involving a thin annular reinforcing coating firmly adhered to such region.

---

The present invention relates primarily to television and more particularly to the control and prevention of fracture and implosive-explosive effects in sealed and vacuumized cathode-ray picture tubes for television reception. The invention more specifically relates to cathode-ray picture tubes having increased resistance to neck breakage and the resultant implosive effects caused thereby.

In the manufacture of television picture tubes having essentially all-glass envelopes, each tube is evacuated to a high degree of vacuum with the resultant effect of creating high external pressures over extensive surface areas of the tube. A detailed discussion of implosive-explosive effects resulting from fracture or breakage of the vacuumized glass envelope in sudden uncontrolled evacuation thereof may be had by reference to our co-pending applications, Ser. No. 180,490, filed Mar. 24, 1962, and Ser. No. 225,448, filed Sept. 24, 1962, which have now matured into U.S. Patents Nos. 3,220,592 and 3,220,593, respectively. Our co-pending applications referenced above are directed to tube constructions which are resistant to both fracture and sudden devacuation without serious fragmentation.

Prior to the inventions described in our co-pending applications, it was necessary to provide a transparent implosion plate usually consisting of a tempered glass panel mounted adjacent and fully coextensive with the tube viewing portion. Alternately, a contoured implosion plate is bonded to the tube viewing area as an integral component part of the tube to resist implosion-explosion effects. However, in both types of tube construction and mounting, whether the tube be unlaminated with a separate protection panel or laminated with an implosion plate integrally mounted thereon, the tubes may still be subject to destructive implosion by physical shock.

In such implosions, the glass of the envelope funnel sidewalls may break violently in such manner as to destroy component parts of the receiver by fragments being projected forcefully in random directions. The several types of implosion panels serve to restrain glass fragmentation in a forward direction and the separate panel serves to absorb front impacts delivered to the tube viewing portion. However, in all cases either the separate or integral implosion plate adds substantially to the cost of the tube per se or its mounting in a receiver cabinet. Further, the implosion plate having substantial dimensions and wall thickness adds to the overall weight and dimensions of the receiver, and in combination with the tube face plate, must provide proper light-transmitting characteristics while protecting viewing areas of the tube against implosion effects.

Our referenced co-pending applications disclose an integrally safe cathode-ray tube (i.e. one which may be used without the necessity of providing an implosion panel) wherein a circumferential band or bands of high-tensile strength material closely surround and encompass the periphery of the envelope viewing portion at substantially the area of maximum cross-sectional dimensions of the envelope to prevent fracture propagation therethrough upon breakage of the envelope from any source.

Recent studies have shown that the source of breakage of a vacuumized cathode-ray tube envelope which is struck on its viewing or face plate light-transmitting surface with sufficient force to cause breakage may well be and frequently is located in the neck-yoke area. It appears that the primary cause of breakage in this area resulting from an impact directed against the face plate is that such an impact, unless directed along the longitudinal axis of the neck, will subject such neck-yoke area to sharp bending forces. Evaluation of the forces resulting from impacting the face plate at an off-center portion thereof indicates that such impact, particularly where of a high level of magnitude, tends to cause deflection of the tube with respect to the neck longitudinal axis. Such deflection is resisted by the tube supporting members to prevent it from actually becoming cocked relative to its original position; however, for an instant, the neck-yoke area is subjected to sharp bending forces which are concentrated in a localized area. In view of the fact that the neck portion of the tube projects from the funnel member as a cantilever, the bending forces to which the neck-yoke area is subjected is a function of a number of factors such as the neck length, neck diameter, and mass. The electron beam gun or guns are positioned at the extremity of the neck. Thus, the longer the distance from the end of the neck to the neck-yoke area of the funnel member and the greater the mass of the beam guns, the greater the bending moment resulting from a force directed against the end of the neck normal to the longitudinal axis thereof. Similarly, the smaller the neck diameter, the greater the concentration of stress resulting from a normal force directed against the end of the neck. This in effect is precisely the action and reaction which occurs when the face plate is subjected to high-level impact at an off-center portion thereof. It is apparent that the inertia of the neck portion to resist sudden movement caused by the high-level impact results in a sufficiently high concentration of bending forces in a localized region to cause breakage in the vicinity of the neck-yoke transition area. This is borne out by the fact that neck breakage in this area (hereinafter referred to as neck-off) does not normally occur when the face plate is impacted at the center line of the neck, i.e. the tube axis, and that the neck-off, when it occurs, usually originates in an area of the neck diametrically opposed to the point of impact relative to the longitudinal axis. Unless controlled, fracture resulting from neck-off may result in implosion-explosion effects with the result that fragments are projected forcefully in random directions.

Accordingly, it is an object of the present invention to provide a direct-viewing cathode-ray television picture tube envelope which is more economical than heretofore possible.

An additional object of the present invention is to provide a cathode-ray tube having greater resistance to neck-off than that heretofore available.

A further object of the present invention is to provide an implosion-resistant cathode-ray tube.

It is an additional object of the present invention to provide a cathode-ray tube having an implosion-resistant feature characterized by reinforcing of the envelope in the neck-yoke area.

Other objects and advantages of the present invention will become readily apparent to those skilled in the art from the following detailed description on which:

FIGURE 1 is a perspective view of a cathode-ray television picture tube fabricated in accordance with the present invention.

FIGURE 2 is a vertical sectional view of the cathode-ray television picture tube envelope illustrated in FIGURE 1.

FIGURE 3 is an enlarged sectional view of the neck-yoke area of the tube envelope illustrated in FIGURE 2.

The present invention is described hereinbelow as specifically applied to the manufacture of a television cathode-ray image tube; however, it will be apparent to those skilled in the art that the invention is fully applicable to the manufacture of many different types of evacuated glass envelopes, particularly those having substantial dimensions which are subject to implosion and concomitant explosion on sudden devacuation.

As pointed out in our co-pending applications, television picture tube envelopes are subjected to various tests by the Underwriters Laboratories. Included among these tests is a face plate impact test wherein a 1¼ pound steel sphere is impacted at five to ten foot pound levels against the viewing area of the face plate of the picture tube. During the conduct of various face plate impact tests it was discovered, surprisingly, that tubes and envelopes having a selectively applied coating of reinforcing material in the neck-yoke area were capable of withstanding more severe face plate impact tests than those not so strengthened.

A full understanding of the present invention may be gained by referring to the drawing which shows a glass cathode-ray picture tube envelope generally designated by the numeral 10 comprising a funnel member 11, face plate member 12, and neck tubulation 13 which are joined to form a unitary hollow glass article. The terminating end of neck 13 has mounted thereon a gun socket 14 connected to one or more electron beam emitting guns. Funnel member 11 is usually frusto-conical or frusto-pyramidal in shape with its small end 11a sealed to neck 13 and its large end 11b sealed to face plate 12. Electromagnetic beam deflecting coils (not shown) are normally mounted at the yoke area where neck 13 and funnel small end 11a are joined to provide proper scanning of the tube screen.

The face plate 12 consists of a concavo-convex viewing portion 12a bounded by a depending annular side panel or flange 12b. Face plate flange 12b and large end 11b of the funnel member terminate in an annular sealing surface of complementary contour. The sealing surfaces are joined at a seal line 15 either by direct fusion of the glass or by an interposed annular layer of low melting glass sealing composition which is selected as being compatible with the thermal and physical characteristics of the parent glass parts. The basic shape of the envelope viewing area may be either circular or rectangular in plan as conventionally known in the art with the sealing surfaces being substantially planar for forming a durable hermetic joint.

The picture tube envelope 10 is provided with a band 20 consisting of high tensile strength material such as steel strapping. Preferably, the tension band 20 is placed around the envelope 10 in an area overlying the face plate flange 12b and is drawn by a tensioning device such as an air wrench to a tension of from 100 to 2000 pounds or more depending upon the particular size and configuration of the envelope. If desired, however, the band 20 can be cemented to the flange 12b and, thus, utilized with no tension.

The ends of the band 20 are passed through a connecting clip (not shown) which is then crimped to form a permanent connection of the band ends. Additionally, if desired, a discontinuous rim band may be placed around the non-viewing corner region of the face plate with the ends of each discontinuity residing in near relation. Typically, the rim band is a two-piece unit with each piece having a generally U-shape in plan and a concavo-convex contour in cross-section complemental to the surrounded external surface of the corner region. This band is adhered to such external surface by an intermediate layer of bonding material such as an epoxy resin as disclosed in the above-referenced applications.

The present invention is contemplated for use in any cathode-ray tube envelope which is subject to the aforementioned neck-off breakage.

The invention as presently contemplated consists of applying selected elements to the neck-yoke area of the tube envelope 10, in other words, that area in the vicinity of the funnel member small end 11a and the neck tubulation 13. As can be seen by viewing the drawings, the neck tubulation 13 is joined to the small end 11a of the funnel member at a seal line 16 with the sealing normally being accomplished by the direct fusion of the glass. A band or annular coating 21 of reinforcing material is externally applied in this area. Numerous materials may be utilized in forming the band 21 of reinforcing coating. For example, devitrifiable solder glasses such as those disclosed in U.S. Patent Nos. 3,011,673 and 3,063,198 which are assigned to the assignee of the present invention, are admirably well suited for this purpose. These devitrifiable solder glasses are reasonably inexpensive, will withstand relatively high temperatures, thus permitting their application prior to the final tube processing operations, and are effective when applied in relatively thin layers, on the order of 0.001 inch to 0.007 inch. The particular solder glass used is selected as being compatible with the thermal and physical characteristics of the base glass. An organo-polysiloxane resin such as that described in patent application Ser. No. 261,226, filed Feb. 26, 1963, may also be used in forming the band or coating 21.

Additionally, various types of epoxy resins or polyesters may be used to form the band 21 of reinforcing material. Examples of such epoxy resins include Union Carbide Epoxy No. EBLA 2875, the resin being a thixotropic paste having a relatively high viscosity when previously mixed with two parts Union Carbide Hardener No. ZBLA 0655 per one part resin. The subject resin is a viscous resin system manufactured by Union Carbide Company primarily for sealing glass-to-metal surfaces. This resin is comprised of liquid epoxide resin which can be cross-linked by a liquid hardener into a thermoset, tough, rupture-resistant solid having excellent dimensional stability and strength. The prescribed resin system has an elongation at rupture of 30 percent, a tensile strength of 1300 p.s.i. and will cure at room temperature in ½ to 1 hour. The reacted resin system forms a stable, firmly adhesive permanent bond between glass and metal surfaces. Other properties of this resin are described in a Union Carbide Plastics bulletin dated Aug. 6, 1962, entitled "Rim Band Bonding System." An epoxy resin which is particularly well suited for this purpose is Union Carbide Epoxy No. EBLM 7652 which is also a thixotropic paste having a relatively high viscosity when mixed two parts Union Carbide Hardener No. EBLM 8653 per three parts resin. This resin system has an elongation at rupture of 1% and will cure at room temperature in three to four hours or at 200° F. in ten minutes. Where an epoxy resin is used as the material for forming the band 21, it preferably is applied in a thickness of 0.010 inch to 0.030 inch.

Other materials such as very high temperature enamels and metallic paints mixed with a silicone resin may also be used for forming the band or coating 21. An example of an enamel is one marketed by Sperex Corporation, Los Angeles, Calif., under its product designation Sperex VHT Enamel. An example of a metallic paint-silicone resin mixture is one marketed by Midland Industrial Finishes Company, Waukegan, Ill. under its product designation SICON Aluminum, production code number 7X2243. Other metallic paints, particularly aluminum paints, mixed with a silicone resin such as Dow Corning 840 Resin (commercially available from Dow Corning Corporation, Midland, Mich.) are also satisfactory. The properties of silicone resins and their use in protective coatings are described in Dow Corning Bulletin; 07–024, dated June 1962. Particularly good results are achieved when ground glass is added to the metallic paint-silicone resin mixture. For example, a glass marketed by the assignee of the present application under its product designation EU–2 glass was mixed with the aforementioned SICON Aluminum and applied to the neck-yoke area as the band or coating 21.

Numerous other materials may be utilized in forming the band or layer 21 of reinforcing coating. Thus, it should be specifically understood that these examples are cited by way of illustration and not by way of limitation. Preferably, the material used for the reinforcing coating should have the characteristics of sealing glass defects such as mars and scratches in the surface, of preventing defects from being imparted to the glass, or of strengthening the glass. Accordingly, anything which reinforces the neck-yoke area from the aforementioned neck-off should be understood to be included within the present invention.

The band or coating 21 preferably is of a width to cover a substantially large area of the funnel member small end and neck tubulation 13. This transitional zone is usually referred to as the yoke area. For example, for a 19 inch television bulb having a beam deflection angle of 114°, bands may be 3½ inches wide or even wider; however, it is significant to note that bands as narrow as ¼ inch were effective in strengthening the envelope from the standpoint of neck-off or neck breakage resulting from impact directed to the face plate. Thus, neck-offs resulted from impacts as low as two foot pounds when no reinforcing band or coating 21 was present in the neck-yoke area; however, surprisingly enough, the mere application of a band 0.4 inch wide to the neck-yoke area of an otherwise identical glass envelope raised the minimum impact breakage to more than four foot pounds. In general, bands are preferably applied to the envelope 10 in the yoke area beginning approximately 0.1 inch to 0.3 inch forward of the seal line 16 and extend forward toward the face plate member 12 approximately 0.7 inch to 1.3 inches. The wider bands extended from aproximately one inch behind the seal line 16 to 2½ inches forward of the seal.

It can be seen from the foregoing that the present invention provides a new and novel cathode-ray tube envelope and method of protecting the same from neck-off breakage caused by objects striking the face plate or other areas of the tube. Additionally, the annular band 21 of reinforcing coating serves to protect the neck-yoke area from scratches or other damages which may otherwise result from service personnel repositioning the envelope in a cabinet or otherwise servicing the unit.

The annular coating 21 of reinforcing material has insufficient thickness to interfere with exteriorly mounting the electron beam deflection element, i.e. the electromagnetic yoke member, on the transitional zone in its normal position. The reinforcing materials are selected and applied in such manner to preclude any interference with mounting the beam deflection element of whatever construction or increasing the power requirements for beam deflections.

Numerous modifications may be resorted to within the spirit and scope of the appended claims.

We claim:
1. An essentially all-glass cathode-ray tube envelope resistant to fracture,
   a substantially funnel-shaped hollow body portion having a viewing portion enclosing its larger end and a neck tubulation projecting from its smaller end,
   said viewing portion having a light-transmitting viewing panel capable of withstanding a five foot-pound impact without breakage and an integral peripheral sidewall region of substantially maximum cross-sectional dimensions of said envelope,
   reinforcing means exteriorly surrounding the peripheral sidewall region of said viewing portion having sufficient yield strength to prevent fracture propagation through the sidewall region therebeneath on breakage, and
   a separate thin annular reinforcing coating firmly adhered to the transition area between the smaller end of said body portion and the adjoining neck tubulation.
2. A cathode-ray tube envelope in accordance with claim 1 wherein
   said reinforcing coating consists of a thin continuous layer of heat-bondable material adhered to exterior surfaces of said transition area extending throughout the normal deflection yoke position.
3. A cathode-ray tube envelope in accordance with claim 1 wherein
   said reinforcing coating consists of a thin annular layer of devitrified solder glass to provide a break-resistant region.
4. A cathode-ray tube envelope in accordance with claim 1 wherein
   said reinforcing coating consists of a thin annular layer of reacted epoxy resin bonded to said transition area to provide a break-resistant region.
5. A cathode-ray tube envelope in accordance with claim 1 wherein
   said reinforcing coating consists of a thin annular layer of a metallic paint-silicone resin mixture bonded to said transition area to provide a break-resistant region.
6. A cathode-ray tube envelope in accordance with claim 1 wherein
   said reinforcing coating consists of a thin annular layer of a metallic paint-silicone resin mixture having ground glass added thereto and bonded to said transition area to provide a break-resistant region.
7. A cathode-ray tube envelope in accordance with claim 1 wherein
   said reinforcing coating consists of a thin annular layer of an aluminum paint-silicone resin mixture bonded to said transition area to provide a break-resistant region.
8. A cathode-ray tube envelope in accordance with claim 1 wherein
   said reinforcing coating consists of a thin annular layer of an aluminum paint-silicone resin mixture having ground glass added thereto and bonded to said transition area to provide a break-resistant region.
9. A cathode-ray tube envelope in accordance with claim 1 wherein
   said reinforcing coating consists of a thin annular layer of a high temperature enamel bonded to said transition area to provide a break-resistant region.
10. A cathode-ray tube envelope in accordance with claim 1 wherein
    said reinforcing means comprises
    at least one annular reinforcing band of high-tensile strength material closely surrounding the peripheral sidewall region of said viewing portion,
    said annular reinforcing band having sufficient yield strength to prevent fracture propagation through the envelope sidewall region therebeneath on breakage.

11. The method of reinforcing an essentially all-glass cathode-ray tube envelope having a substantially funnel-shaped hollow body portion with a viewing portion enclosing its larger end and a neck tubulation projecting from its smaller end, comprising the steps of applying reinforcing means in firmly adhered relation to the non-viewing peripheral sidewall region of substantially maximum cross-sectional dimensions of said viewing portion, said reinforcing means having sufficient yield strength to retard fracture propagation through the annular sidewall region therebeneath on breakage of said envelope, and applying a separate thin annular reinforcing coating in firmly adhered relation in a continuous annular pattern to the transition area between the smaller end of the body portion and the adjoining neck tubulation.

References Cited

UNITED STATES PATENTS

| | | | |
|---|---|---|---|
| 2,083,198 | 6/1937 | Loewe | 220—2.1 X |
| 2,293,529 | 8/1942 | Bedford | 220—2.1 X |
| 2,703,373 | 3/1955 | Cummings | 220—2.1 X |
| 2,785,820 | 3/1957 | Vincent et al. | 220—2.1 |
| 2,874,017 | 2/1959 | Henry et al. | 220—2.1 |
| 3,113,347 | 12/1963 | Kurfovich | 220—2.1 X |
| 3,166,211 | 1/1965 | Stel et al. | 220—2.1 |
| 3,222,206 | 12/1965 | Cornelissen et al. | 220—2.1 X |

FOREIGN PATENTS

| | | |
|---|---|---|
| 753,696 | 7/1956 | Great Britain. |

MARTHA L. RICE, *Primary Examiner.*